G. D. WALTON.
MATCH LIGHTER.
APPLICATION FILED NOV. 25, 1912.
1,123,440.
Patented Jan. 5, 1915.
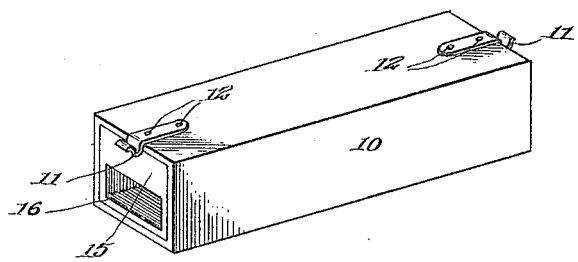
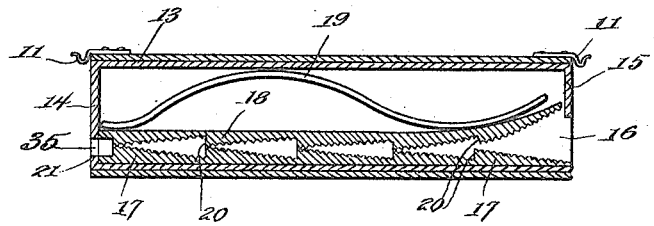
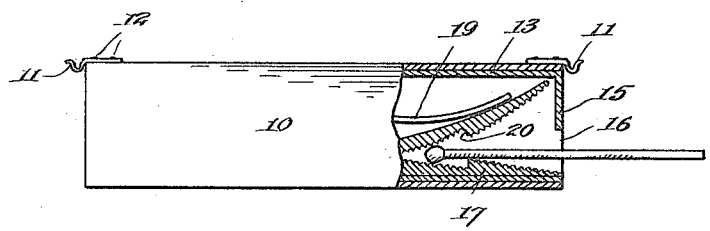
WITNESSES
INVENTOR
George D. Walton,

UNITED STATES PATENT OFFICE.

GEORGE D. WALTON, OF NAKUSP, BRITISH COLUMBIA, CANADA.

MATCH-LIGHTER.

1,123,440. Specification of Letters Patent. Patented Jan. 5, 1915.

Application filed November 25, 1912. Serial No. 733,377.

*To all whom it may concern:*

Be it known that I, GEORGE D. WALTON, a citizen and subject of Great Britain, residing at Nakusp, Province of British Columbia, and Dominion of Canada, have invented new and useful Improvements in Match-Lighters, of which the following is a specification.

My invention relates to match lighters and more particularly to a small pocket device which may be used for lighting matches at all times and places, or, one which may be attached to a lamp or the like, either permanently or detachably.

The invention aims to provide a device of this kind which will be simple and compact in construction so that it may be manufactured at moderate cost and will occupy minimum space as when carried in the pocket, and one which will prove highly efficient for the purposes stated, be durable in use, and an article which may be effectively used as an advertising novelty.

With the above and other objects in view, my invention relates to such details of construction and in the arrangement and combination of the several parts employed as will be hereinafter fully described and specifically pointed out in the appended claims.

In describing my invention in detail, reference will be had to the accompanying drawings wherein like reference characters denote like or corresponding parts throughout the several views, and in which:—

Figure 1 is a perspective view of the match lighter; Fig. 2 is a longitudinal sectional view taken through the match lighter; Fig. 3 is a side view of the lighter partly in elevation and partly in section showing the application of the match thereto.

In reducing my invention to practice, I provide an outer casing 10 of suitable size and shape preferably rectangular in cross section. This casing as illustrated is open at both ends, each end portion being provided with an overhanging spring catch 11, denote like or corresponding parts throughout such means as shown at 12.

Slidable within the casing 10 is an inner casing 13, conforming in size and shape to the interior of the first mentioned casing. The inner casing however has its end 14 partly closed and the other end partly closed by the depending member 15, thus providing a space through which matches may be inserted. The inner casing and outer casing are of approximately the same length so that when the two are assembled catches 11 of the outer casing will engage the opposite ends of the inner casing, thus removably holding the inner casing within the outer casing. The catches 11 are of spring material, and a slight upward pressure thereon will move the same out of the path of movement of the inner casing and permit the same to be partly or completely drawn out. When the outer casing is drawn partly off of the inner casing it acts as a shield at the entrance of the inner casing against wind for a purpose which will be readily understood.

Positioned upon the bottom of the inner casing 13 is a file or abrading member 17. The bottom of this member is flat so as to rest firmly upon the bottom of the inner casing as illustrated in Fig. 3. On the top member 17 is a plurality of successive inclined planes each of which is provided with a roughened or abrading surface of the nature of a file as shown. Superposed on the member 17 is a corresponding member 18, the roughened inclined surfaces of which correspond in number and position to those on the member 17. The forward end of the member 18 is however curved upwardly so as to permit the head of a match to be readily inserted between said member and the lower member and also to prevent the upper member from sliding out through the aperture 16, said upwardly curved end coming in contact with the depending member 15, and the other end of the abrading member 18 coming in contact with the end wall 14 of the inner casing. The abrading member 18 is yieldably held in place by means of a leaf spring 19 in the form of a compound curve, two portions of the said spring engaging the member 18, while the portion of the spring between its ends contacts with the upper side in the casing.

It is thought that the operation of my device will be clearly apparent from the foregoing description, having particular reference to Figs. 3 and 4 of the drawings. A match to be lighted is simply inserted through the aperture 16 so as to engage two opposite inclined surfaces of the abrading members 17 and 18, which will cause its head to become ignited through the friction produced by the contact of the same with the roughened or abrading surfaces of the inclined planes of the abrading members or its coming in contact with the upstanding shoulders 20 formed by the series of successive inclined surfaces. It will be noted that the spring 19 permits the match to be readily inserted or withdrawn and at the same time restores the parts to their normal positions after withdrawal.

Upon reference to Fig. 2 of the drawings, it will be recognized that I have provided an opening 35 in the rear end of the casing 13 consequently allowing matches to be inserted between the members 17 and 18 from the rear end, thus obviating the removal of the globe from the lantern when lighting the wick.

I desire to lay the greatest of stress upon the simplicity of my invention and it is thought that the advantages and novel features of the same will be readily recognized from the disclosure.

I desire it to be understood that I may make slight changes in the construction and in the arrangement and combination of the several parts, provided such changes fall within the scope of the subjoined claims.

Having thus fully described my invention, what I claim as new and desire to secure by Letters Patent is:—

1. A device of the character described comprising a casing provided at one end with an inlet opening, a plate mounted in the bottom of said casing and provided with a plurality of inclined roughened faces, a second plate mounted in said casing and provided with a plurality of inclined roughened faces engaging the roughened faces of said first mentioned plate, the outer end of said second-mentioned plate being extended upwardly to engage said casing above the opening formed in the end thereof, and resilient means yieldably holding said second plate in engagement with said first mentioned plate, whereby the teeth of said plates will be held in engagement and said first-mentioned plate prevented from moving out of said casing through the opening formed in the end thereof.

2. A device of the character described comprising a casing provided with an inlet opening, a striking element removably mounted in said casing, a second striking element removably mounted in said casing, said striking elements being provided with interlocking teeth, and resilient means engaging the end portions of said second striking element for yieldably holding said striking element in engagement with said first mentioned striking element.

3. A device of the character described comprising a casing provided with an inlet opening, a lower plate mounted in said casing and having its upper face provided with inclined roughened surfaces, an upper plate mounted in said casing and having its lower face provided with inclined roughened surfaces engaging the inclined roughened surfaces of said lower plate and having its forward end portion extended upwardly and engaging the end of said casing above the inlet opening formed therein, and a strip of resilient material mounted in said casing with its intermediate portion engaging the body of said casing and its end portions engaging the forward and rear end portions of said upper plate whereby the rear end portion of said upper plate will at all times be held in engagement with said lower plate and the forward end portion of said upper plate may be moved out of engagement with said lower plate by a match extended into said casing through the opening formed therein.

GEORGE D. WALTON.

Witnesses:
JOHN WILLIAM BAILEY,
W. Y. CLARK.

Copies of this patent may be obtained for five cents each, by addressing the "Commissioner of Patents, Washington, D. C."